Dec. 26, 1922. 1,439,838
J. H. PRATT.
GATE OPENING ATTACHMENT.
FILED OCT. 18, 1921.

John H. Pratt
INVENTOR

BY J. M. Thomas
ATTORNEY

Patented Dec. 26, 1922.

1,439,838

UNITED STATES PATENT OFFICE.

JOHN H. PRATT, OF SHELLEY, IDAHO.

GATE-OPENING ATTACHMENT.

Application filed October 18, 1921. Serial No. 508,486.

*To all whom it may concern:*

Be it known that I, JOHN H. PRATT, a citizen of the United States, residing at Shelley, in the county of Bingham and State of Idaho, have invented certain new and useful Improvements in Gate-Opening Attachments, of which the following is a specification.

My invention relates to gates, and has for its object to provide an attachment which may be placed on any farm gate by which said gate may be easily and quickly opened from either side by driving an automobile or wagon against a bumper element medially secured on said gate.

These objects I accomplish with the device illustrated in the accompanying drawings in which similar letters and numerals of reference indicate like parts throughout the several views, and as described in the specification forming a part of this application and pointed out in the appended claim.

Figure 1:
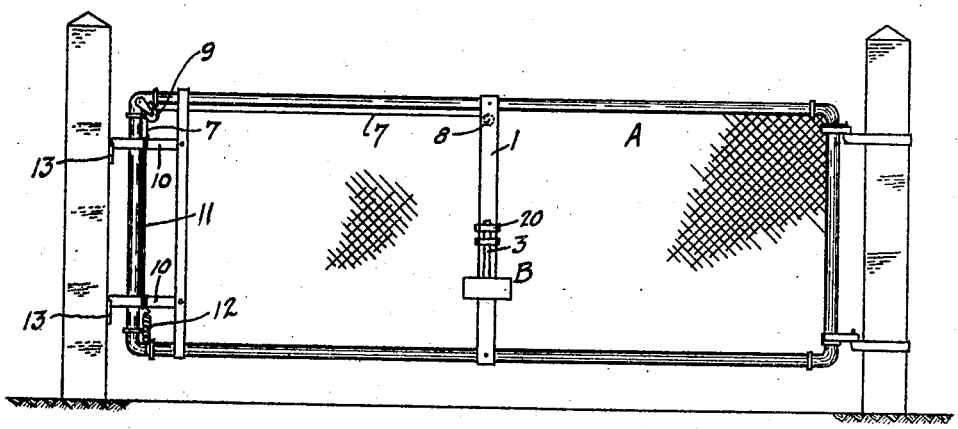
Figure 2:
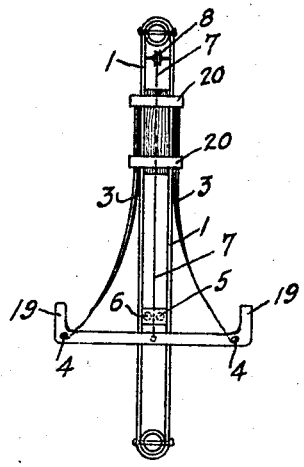
Figure 3:
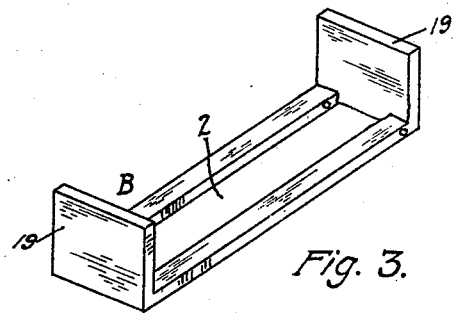
Figure 4:
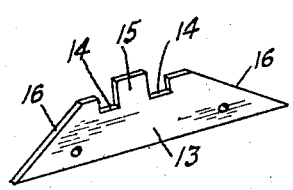

In the drawings in which I have shown a substantial embodiment of my invention, Figure 1 is a side elevation of a farm gate with my attachment thereon. Figure 2 is a vertical section of the gate and portions of my attachment. Figure 3 is a view in perspective of the bumper element. Figure 4 is a view in perspective of the catch of the gate.

It is very desirable when driving an automobile to be able to open a gate for the purpose of driving through the gateway without getting off the vehicle, and the present invention provides a simple, economical and quickly operating device which may be attached on any farm gate, with slight modifications, by which the gate may be opened by striking one of the elements of my device with the buffer of an automobile or with the end of the tongue of a wagon.

My invention consists of two straps of iron 1 which are fastened vertically on opposite sides of the gate A, and medially as to the length of the gate, preferably I fasten these straps 1 by bolts as desired. A U-shaped bumper B, having an elongated slot 2 therein, is secured to and slidably carried on said straps 1 with the said straps passed through the slot in said bumper. The said bumper is secured to said straps 1 by two flat springs 3, one on each side of the gate, and each having one end portion fastened on said straps 1 by clamps 20. As will be obvious said springs may be fastened by bolts passed through them and through the said straps. The other end of each of said springs is secured on the respective inner angle of said bumper B by pivot pins 4, which construction allows both of said springs to be flexed for a greater portion of their lengths by moving said bumper longitudinally, and laterally as to the gate. The said bumper B is vertically positioned on said gate, so that, the legs 19 of the bumper will be struck by the buffer of an automobile and may be of such length that the tongue of a farm wagon will strike them when moved at right angles to the gate. Two sheave pulleys 5 and 6 are mounted on said gate adjacent said bumper and spaced apart in order that they will be on opposite sides of a cable 7, the end of which is fastened medially to said bumper, the object of such construction is that the said cable will be passed over either of said sheave pulleys 5 or 6 when the bumper is moved toward that particular pulley and will not engage either sheave pulley when the bumper is in normal position. The said cable is passed over another sheave pulley 8 which is journalled between said straps 1 near their upper ends. The said cable 7 is then lead over another sheave pulley 9 which is secured at the upper inner angle of the latch end of the gate and then its other end is secured to the upper of the two latches 10. The said latches 10 are simple flat bars of iron pivoted at one end to the gate and to engage in notches of the catch at their other ends. I prefer to use two latches and they are held in spaced relation to each other by the link 11, and on the lower one of them is secured the spring 12 by which they are normally held in engagement with the catches. Each of the catches 13 has two notches 14 therein with an upstanding lug 15 between them to prevent the latches from jumping out of the notch 14 when the gate swings to the closed position. The hinges used to hang the gate may be of any of the well known types which cause the gate to resume the closed position when opened in either direction and allowed to swing freely.

The operation of my device is as follows:—When the gate is closed the latches 10 may be in either of the notches 14 and will be normally held therein by the weight of the latches and the spring 12. When the automobile is driven against either leg 19 of the bumper, the bumper will be moved away from the automobile, and this movement will tension the flat springs 3 and pull a portion of said cable 7 over one of the sheave pulleys adjacent said bumper. The said cable 7 will be moved longitudinally throughout its entire length and raise the engaged latches 10 out of the notch 14 and hold said latches high enough and for the time required for the gate to swing on its hinges and pass the latches 10, over the lugs 15, and to swing far enough open that the automobile may be driven through the gateway. The said springs 3 will return the bumper to normal position and the cable 7 will be moved longitudinally and allow the latches to assume their normal position, and by the time the gate has swung to the closed position the latches will be free to slide up the inclined portion of the catches 16 and enter the notch 14 first reached and hold the gate in closed position.

Having thus described my invention and its operation I desire to secure by Letters Patent and claim:—

A gate opening attachment comprising a gate hinged to be swung in either direction; a bumper having vertical legs on opposite sides of the gate and an elongated slot medially therein; springs to move said bumper to normal position; straps on said gate passed through said slot and to which said springs are fastened; sheave pulleys journalled in said straps; a flexible cable having one end fastened medially on said bumper and adapted to engage said sheave pulleys and with its other end fastened to a latch on the free end of the gate; and a catch having an inclined face on each end portion with notches at the upper end of said inclines and an upstanding lug between said notches.

In testimony whereof I have affixed my signature.

JOHN H. PRATT.